United States Patent [19]

Baresh et al.

[11] 4,400,884
[45] Aug. 30, 1983

[54] SKIN CONTOUR INSPECTION SYSTEM

[75] Inventors: Joseph M. Baresh, Seattle; Elmer Hisey, Bellevue; Robert E. Nash, Seattle, all of Wash.

[73] Assignee: The Boeing Company, Seattle, Wash.

[21] Appl. No.: 193,326

[22] Filed: Oct. 2, 1980

[51] Int. Cl.³ .............................................. G01B 7/28
[52] U.S. Cl. ................................. 33/174 PA; 33/175
[58] Field of Search .......... 33/174 L, 174 P, 174 PA, 33/176, 175

[56] References Cited

U.S. PATENT DOCUMENTS

| 2,977,533 | 3/1961 | Savage | 33/174 PA |
| 3,321,838 | 5/1967 | Albertson | 33/174 P |
| 3,733,704 | 5/1973 | Farabaugh | 33/174 L |
| 4,221,053 | 9/1980 | Bobel et al. | 33/174 P X |

FOREIGN PATENT DOCUMENTS 778552 7/1957 United Kingdom ........... 33/174 PA

Primary Examiner—Harry N. Haroian
Attorney, Agent, or Firm—Morris A. Case; Bernard A. Donahue

[57] ABSTRACT

A U-shaped checking fixture has the legs of a "U" extending vertically upward. A series of measuring probes extend horizontally and laterally inward a measured amount from one of the legs and the ends of the probe define a contour of the skin to be checked. A skin is suspended essentially vertically alongside the measuring probes, another set of matching probes on the other leg of the U-shaped fixture force the skin against the measuring probes and any out of tolerance part of the skin is recorded.

7 Claims, 6 Drawing Figures

4,400,884

SKIN CONTOUR INSPECTION SYSTEM

BACKGROUND OF THE INVENTION

It is standard practice to check the contour of large skin panels such as are used in aircraft wing assemblies by use of a horizontal fixture containing headers shaped to the proper contour. The skin is draped over the headers, a limited load is applied on the skin, and the deviation measured between the skin and the headers. A separate check fixture is required for upper and lower skin panels and it requires a difficult header reorientation procedure or the use of an additional pair of fixtures to accommodate skin panels for an opposite wing. It is desirable to have a single fixture that can accommodate all of the wing skin panels for a particular aircraft model and it was found that such a fixture can be prepared that furthermore suspends the formed skin in the vertical position in which skins are normally conveyed.

SUMMARY OF THE INVENTION

A series of probes extend horizontally to define a selected skin contour. A formed skin is suspended in a vertical position adjacent to the skin defining probes. A series of matching probes extend horizontally to force the formed skin against the contour defining probes with a predetermined force and the deviation is measured between the skin and the skin defining probes.

It is an object of this invention to provide a fixture for checking a compound contour of a skin in a vertical position.

It is another object of this invention to provide a single fixture for checking various skins of compound contour.

DETAILED DESCRIPTION

Figure 1:
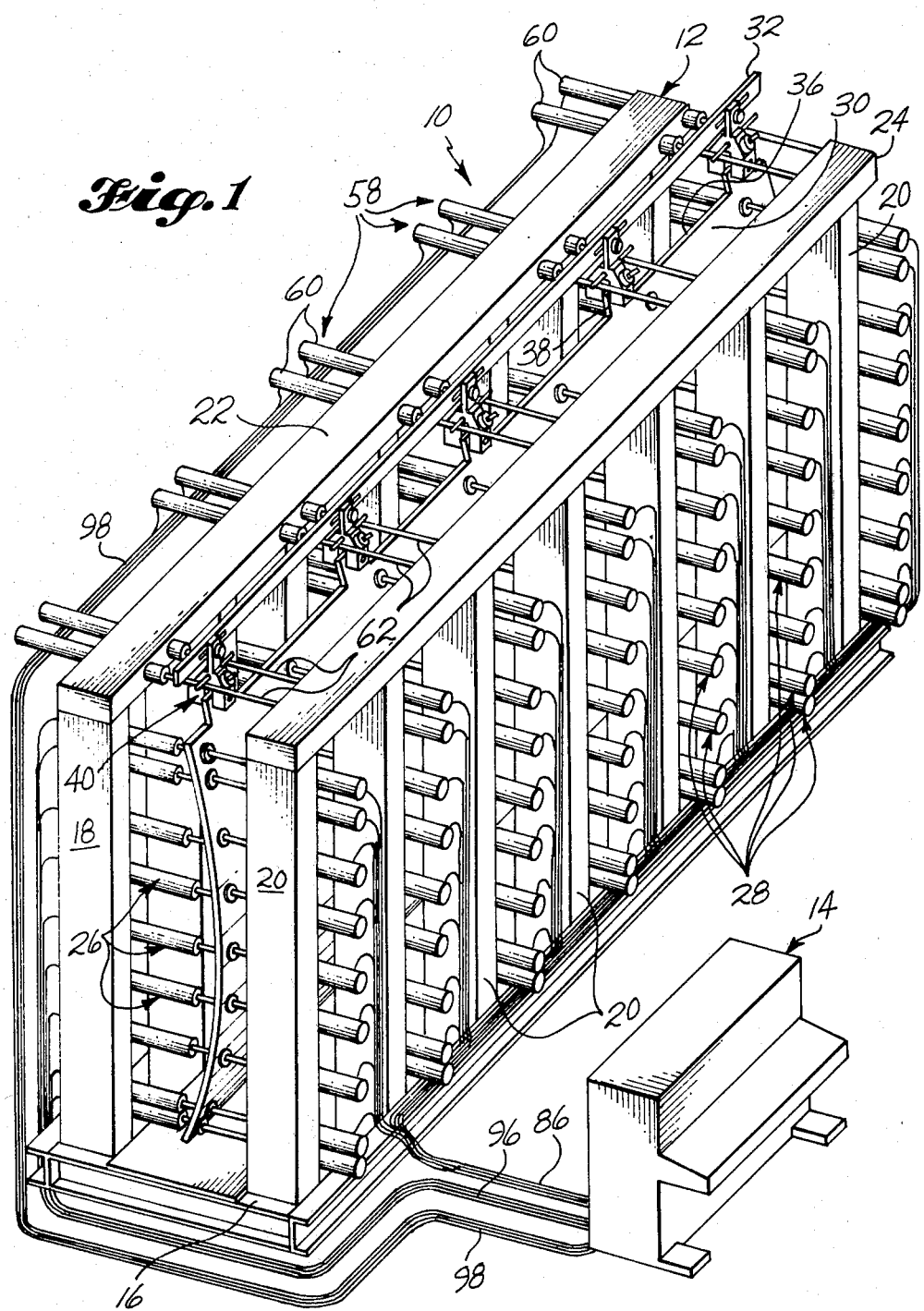
FIG. 1 is a perspective view of the contour checking apparatus of this invention.

A skin contour verification apparatus 10, has a checking fixture 12, and a systems control unit 14. The fixture has a U-shaped construction with a base 16, spaced apart vertically extending leg structures 18 and 20, and the legs are topped with horizontally extending upper members 22 and 24, respectively. Connected to leg structures 18 are a series of measuring probes 26 that extend horizontally and laterally toward the opposite leg structure. There are many of these probes, and they all are controlled to be separately extended and locked in place so that the ends of the probes define the contour of a skin to be checked. These probes can be positioned to define any desired skin contour. A set of axially aligned pressure inducing probes 28 are joined to the leg structures 20 and extend toward the first set of probes.

A formed skin 30 is suspended in the checking fixture in an essentially vertical position. The skin is brought to the fixture on an overhead rail 32. The rail is supported through rods 34 to an overhead conveyor (not shown). The skin is supported along an upper edge 36 through a series of spaced apart supporting tabs 38, and a series of quick connect hangers 40 join the tabs to the rail. Each hanger has a pin 42 that extends through hole 44, in a tab, to secure the fastener to the tab and each hanger has a quick connect/disconnect fastener 46 with pin 48 to quickly secure the hanger to the overhead rail and to quickly release the hanger from the rail. The rail has a horizontal slot 50 and the hanger has a vertical slot 52 to assist in alignment. Each hanger also has a rod 54 and a rod 56 to extend horizontally and longitudinally outward. These rods are used to support the skins during the checking process. A series of skin support units 58 that provide support to the rods on the hangers are made up of pneumatic cylinders 60 that are mounted to the upper horizontal member 22 of the checking fixture 12. These cylinders are each located to advance and retract a laterally extending support rod 62. These support rods provide point of contact support to the rods 54 and 56 of the hangers.

Figure 3:
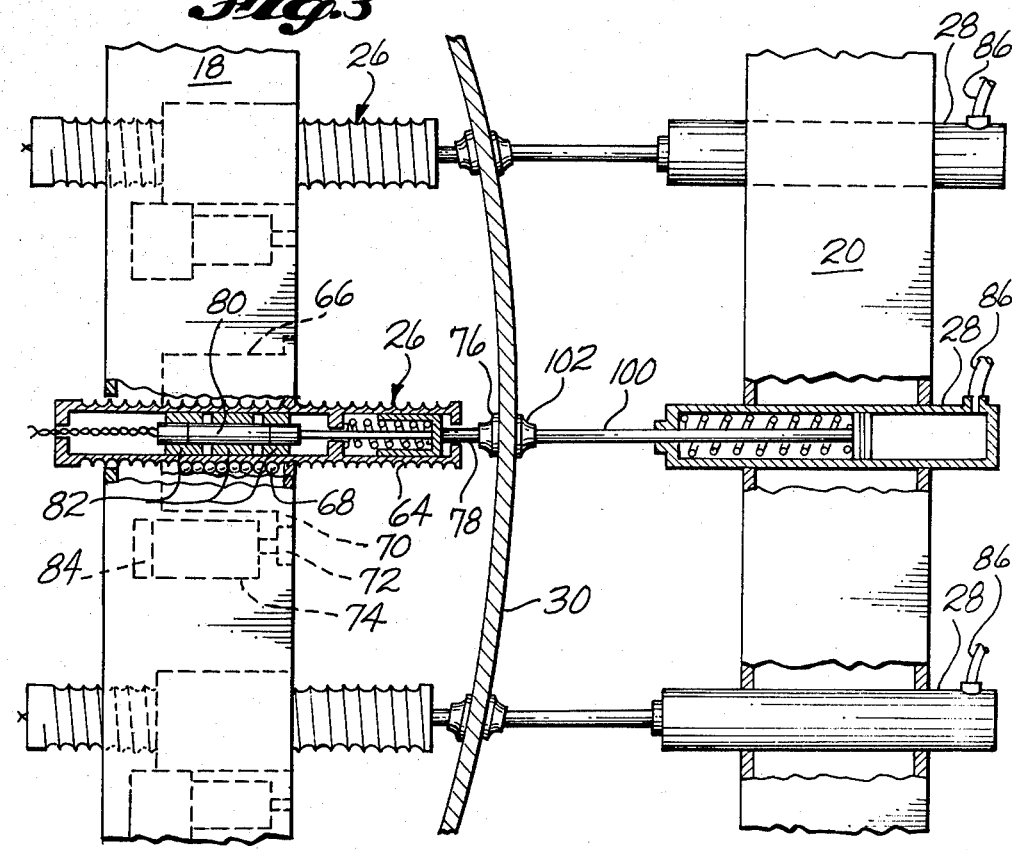
FIG. 3 is a fragmented sectional view taken along line 3—3 of FIG. 2.
Figure 2:
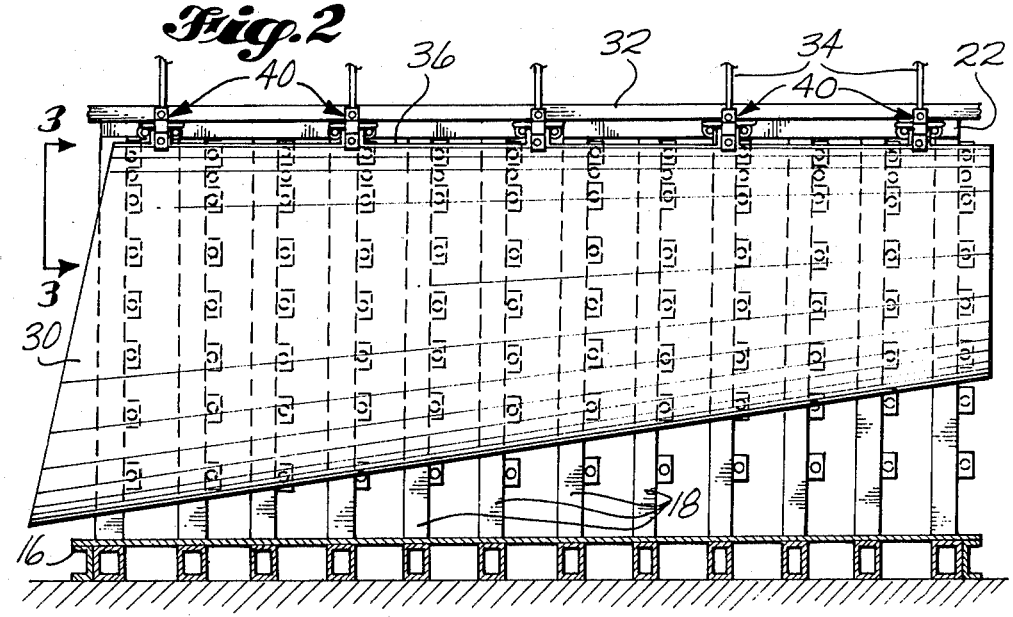
FIG. 2 is a side elevation sectional view from inside the checking fixture of the checking apparatus and looking toward a positioned skin.
Figure 4:
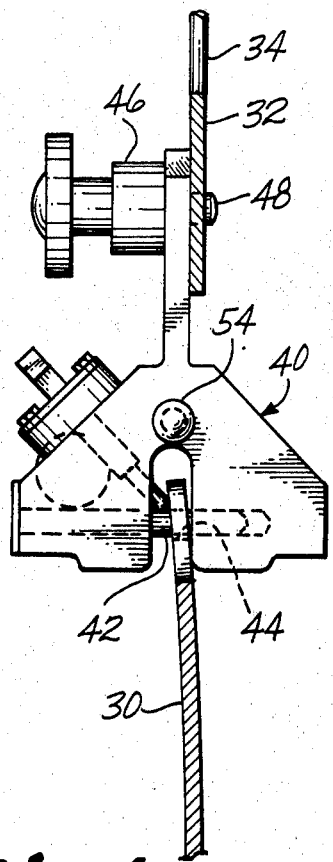
FIG. 4 is an end view of a hanger used in this invention.
Figure 5:
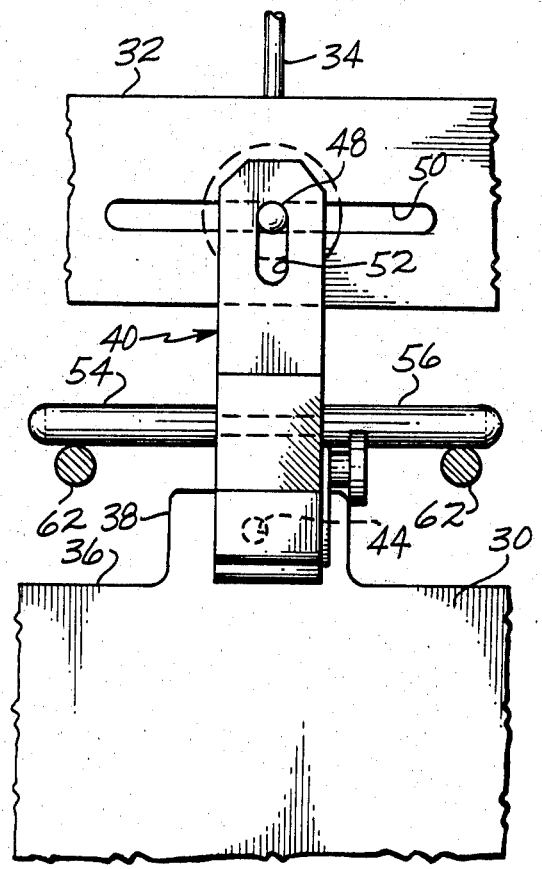
FIG. 5 is a side view of the hanger of FIG. 4.
Figure 6:
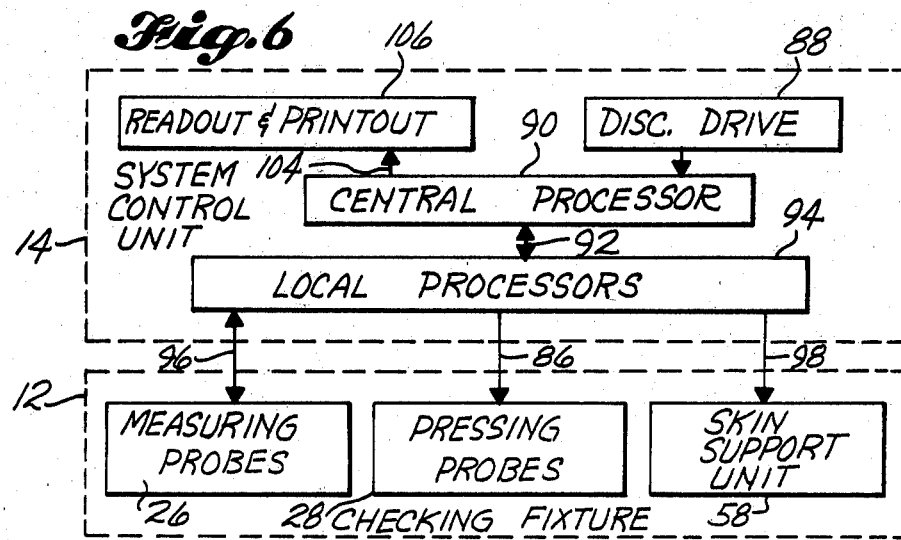
FIG. 6 is a schematic of the controls for this invention.

Various types of probes may be used to check the skins. In a preferred embodiment, as is best shown in FIG. 3, the measuring probes 26 use an electromechanical transducer probe of the linear variable transformer type and the pressure inducing probes 28 use pressure controlled pneumatic cylinders. The measuring probes have a cylindrical housing with an outer surface 64 of helical grooves shaped to handle ball bearings. The housing is mounted in a nut 66 that is rotatably secured to the vertical leg structures 18. As the nut rotates, a series of balls 68 move the probe in or out depending on the direction of rotation of the nut. A gear 70 is located on the nut to mesh with a gear 72 on a reversible drive motor 74. This permits accurate control of movement of the probe in either direction, and when the motor is stopped the balls lock the probe into position. A self-aligning joint 76 is located on the end of shaft 78 of the probe; a magnetic core 80 on the shaft provides a path for magnetic flux linking the core position to the three coils 82. An encoder 84 registers the location or position of the measuring probe. The position of the pressure inducing force of probes 28 is controlled by the pressure in line 86.

In operation, all the information for controlling the checking of a skin of a particular contour is initially fed into a disk drive 88. The disk drive then sends the required information into a central processor 90 which in turn feeds information through two-way lines 92 to several local processors 94. The local processors send signals through two-way lines 96 to the series of measuring probes 26 where each probe is first advanced and then locked in position with the ends of the self aligning joints 76 located to define the particular compound contour. Next, the formed skin 30, which is suspended vertically by hangers 40 from overhead rail 32, is brought into position adjacent to the measuring probes. A signal from local processors is sent from the local processors over pneumatic line 98 to the skin support unit 58 where the cylinder 60 is actuated to advance piston rod 62 to a position under hanger rods 54 and 56. Then, disconnect fasteners 46 are actuated to release the hangers from the overhead rail and leave the skin suspended on the rods 62. The local processors then send compressed air to pressure inducing probes 28, through lines 86 and rods 100, with self-aligning joints 102 on the end, force the skin against the contour defining probes.

The pressure in lines 86 is set to provide the correct pressure acting against the skins. The electromechanical transducer feature on the measuring probes then sends a signal of any out of tolerance condition of the skin, along with that location, back through the local processors. The central processors then send the signals over line 104 into a read out and print out unit 106 which converts the signal to show the location and amount of any out of tolerance part of the contour of the skin. The hangers are again joined to the overhead rail 32, the support rods 62 removed, the rods on the pressure inducing probes retracted and the skin moved out of the checking fixture to make way for a new skin to be checked.

We claim:

1. An apparatus for checking the contour of a formed skin comprising: a pair of spaced apart vertical structures, a plurality of probes mounted to extend laterally from one of the structures toward the second structure, means for controlling the outwardly extending distance of each probe to in combination with the ends of the probes defining the contour of a skin to be checked, means for suspending a formed skin in essentially a vertical position adjacent the positioned probes, an equal number of a second set of probes axially aligned with the first set of probes and reciprocally movable to extend from the second structure toward the first set of probes, means for controlling the advance of the second set of probes to exert a predetermined pressure to force the formed skin against the first set of probes, and means for determining the amount and location of any out of tolerance part of the formed skin, wherein the means for suspending the formed skin comprises: a series of hangers spaced along and connected to an upper edge of the formed skin, a longitudinally extending horizontal rod to extend on each side of each hanger, means for supporting under each rod to suspend the skin while permitting movement in response to the advance of the second set of probes.

2. An apparatus for checking the contour of a formed skin as in claim 1 wherein the means for supporting under each rod comprises a reciprocally movable rod to extend laterally outward from one of the structures toward the other structure to support the rods extending from the hangers.

3. An apparatus for checking the contour of a formed skin comprising: a pair of spaced apart vertical structures, a plurality of probes mounted to extend laterally from one of the structures toward the second structure, means for controlling the outwardly extending distance of each probe to in combination with the ends of the probes defining the contour of a skin to be checked, means for suspending a formed skin in essentially a vertical position adjacent the positioned probes, an equal number of a second set of probes axially aligned with the first set of probes and reciprocally movable to extend from the second structure toward the first set of probes, means for controlling the advance of the second set of probes to exert a predetermined pressure to force the formed skin against the first set of probes, and means for determining the amount and location of any out of tolerance part of the formed skin, wherein the means for suspending the formed skin comprises: a series of hangers spaced along and connected to an upper edge of the formed skin with each hanger having a longitudinal extending horizontal rod on each side, means connected to one of the structures to laterally extend a series of rods to give point of contact support under each horizontally extending hanger connected rod to support the skin during checking and to be moved aside to permit entry and removal, an overhead rail from which the hangers are suspended, and means for quickly disconnecting and for reconnecting the hanger to the overhead rail.

4. An apparatus for checking the contour of a formed skin comprising: a pair of spaced apart vertical structures, a plurality of probes mounted to extend laterally from one of the structures toward the second structure, means for controlling the outwardly extending distance of each probe to in combination with the ends of the probes defining the contour of a skin to be checked, means for suspending a formed skin in essentially a vertical position adjacent the positioned probes, an equal number of a second set of probes axially aligned with the first set of probes and reciprocally movable to extend from the second structure toward the first set of probes, means for controlling the advance of the second set of probes to exert a predetermined pressure to force the the formed skin against the first set of probes, and means for determining the amount and location of any out of tolerance part of the formed skin, wherein the means for determining the amount and location of any out of tolerance part of the formed skin comprises: an electromechanical displacement unit located on the end of each of the first set of probes, and means for recording an electrical signal from each of the electromechanical displacement units.

5. A method of checking a contoured skin, with steps comprising: placing a vertically hanging contoured skin in a check fixture, advancing each of a series of probes from a side of the fixture toward the contoured skin, controlling the travel of each probe to define a desired skin contour, forcing the contoured skin against the probe ends with a predetermined force by advancing a second series of probes from the opposite side of the fixture, and measuring configuration compliance of the contoured skin at each probe location.

6. A method of checking a contoured skin, with steps comprising: defining the configuration of a desired skin contour by individually advancing a series of probes from one side toward the opposite side of a check fixture, locking the probes in position, hanging a contoured skin vertically from an overhead rail, moving the contoured skin into the check fixture alongside the contour defining probes, transferring support of the contoured skin from the overhead rail to the fixture, forcing the contoured skin against the ends of the probes with a predetermined force by advancing a second series of alinged probes from the opposite side of the check fixture, measuring the compliance of the contoured skin at each probe location, retracting the second series of probes, transferring support of the contoured skin back to the overhead rail, and removing the contoured skin from the check fixture.

7. A method of checking a contoured skin as in claim 6, with further steps of defining a new contour in the check fixture by individually moving the contour defining probes, and locking them in the new position.

* * * * *